Patented Jan. 12, 1954

2,666,001

UNITED STATES PATENT OFFICE 2,666,001

CHEMICAL METHOD FOR REMOVING RESIDUAL SAND FROM METAL CASTINGS FORMED IN SAND-TYPE MOLDS

William A. Marshall, Chicago, Ill., assignor to The Pure Oil Company, Chicago, Ill., a corporation of Ohio No Drawing. Application June 15, 1950,
Serial No. 168,377

11 Claims. (Cl. 134—27)

This invention relates to the casting of metals in non-permanent molds having siliceous refractory compositions. It is more particularly concerned with the removal of residual sand granules adherent to metal castings formed in the said sand-type molds by chemical cleaning.

In the channels of commerce there is a constant flow of articles of manufacture, the form of which is attributed to one or a combination of methods of fabrication available to the industry. In many instances methods of manufacture of various substances are employed whereby the finished articles are assembled from component parts produced in a variety of ways. The method of shaping these units in general is determined by the physical limitations of the raw material, economic features and other aspects that must be balanced in arriving at a final determination of what method of fabrication must be used. One such method that has considerable application is that of producing appropriate metallic articles by mold casting in which a mold is formed around a suitable pattern made of wood or the like, which conform to the configuration of the desired article. The pattern is then removed and the resulting void is filled with the desired metal thereby producing a metallic unit corresponding to the structure of the molded pattern. In conventional foundry practices two methods of mold casting are employed. One method uses permanent molds while the other method utilizes non-permanent or sand-type molds. Advantages and disadvantages are inherent in each method and each method has particular attributes which make its application in certain casting procedures desirable. Sand mold casting is used to a large extent in casting large units such as railroad car wheels, internal combustion engine blocks, large frame structures, etc., where the cost of manufacturing a suitable permanent mold would be prohibitive. Its use, however, is not so limited and as an opposite extreme sand molds are particularly efficacious in the production of small shapes having complex geometric configurations. Because of the plasticity of the mold sand compositions this type of refractory material is quite adaptable to the manufacture of such molds and their complementary cores in the reproduction of complicated patterns.

The mold sand compositions employed in preparing the molds and their cores comprise a sand and a suitable binder. The sand used should be highly refractory to permit resistance to the heat encountered in foundry operations. This refractoriness is supplied by the silica component of the sand which is practically infusible at temperatures employed in foundry operations. The quartz or silica granules are held together in a compact mass by a natural bonding material such as clay or bentonite which completely covers the separate granules. To assist these natural binding agents in the retention of the sand mold compositions in a compact mass, organic binders also have application in the preparation of these sand molds. These organic binders are termed core oils and generally consist of such compounds as linseed oil, molasses; glue, natural and synthetic resins and polymers as well as many proprietary compounds including one or more of the foregoing in their composition. These binders because of their organic nature are subject to decomposition at the temperatures used in the casting of metal objects and the decomposition products formed function as adhesives increasing the conglutinative properties of the sand resulting in the adhesion of siliceous granular particles to the castings when the castings are removed from the mold.

Various methods are employed for cleaning metals cast in sand molds which entail both mechanical and chemical actions. In the former category is included abrasive cleaning methods such as sand blasting. In this method sand is projected against the metal surface being cleaned at a high velocity which results from the application of high pressure air. This method is used to a large extent in cleaning structures having surfaces which are so joined to one another as not to entrap the mold sand particles in such a manner as to prevent their being readily removed from said surfaces by abrasive cleaning. This method is also employed in cleaning non-ferrous castings but care has to be taken that the flow of sand is so regulated that the impinging of the sand particles on the soft non-ferrous surfaces does not damage the casting. Other abrasive cleaning methods are also employed in which other abrasives such as metallic shot are used and means other than air pressure are employed to deliver the abrasives at a high velocity to the surfaces of the casting undergoing cleaning.

Chemical methods of cleaning which are available to the industry, however, produce cleaner castings than the foregoing mechanical procedures. This is effected because a great deal of trouble is occasioned not only by the retention of the granular sand on the casting by reason of the adhesive properties of the decomposition products of the organic binders but also trouble results from sand fusing and burning into the metal. This latter problem depends to some extent upon the character of the natural occurring bentonite or clay bonds. In such instances the adhering sand particles are immune to removal by abrasive cleaning methods and they can only be removed by attacking and dissolving the residual siliceous particles with a chemical reagent. Another advantage available through the use of chemical cleaning methods is apparent in the removal of residual mold sand from intricate metallic shapes which are formed in sand type molds. These shapes of necessity have voids, crevices and pockets which form natural receptacles for granules of sand used in the molding of such articles. It is, therefore, incumbent that cleaning methods be employed which will produce the complete removal of such residual sand particles from these castings which have complex surfaces. Obviously the mechanical methods available are not applicable and one must resort to cleaning this type of structure by a chemical method in which the retained sand particles are reached and readily removed by the fluid reagents used in such chemical methods. In these chemical methods the metal casting is immersed into a liquid bath of an acidic chemical reagent and by chemical reaction the residual sand is removed by the attacking solution. Thereafter the casting is immersed in an alkaline solution to neutralize the acid. The alkaline solution may consist of an aqueous solution containing neutralizing amounts of an alkali material such as the hydroxides of sodium, potassium, ammonium, etc. In the alternative a water-wash employing a hot water may be used to remove the acid remaining on the metallic casting. This latter method is the preferred expedient for removing the residual traces of the acid bath because the salts formed in the neutralization reaction generally are insoluble and necessitate a subsequent removal thereof. The term "neutralizing solution" used in the claims therefore includes both of these methods for removing the acid from the casting. The baths in which the metal casting is immersed generally consist of mineral acids which either dissolve the residual sand or the conglutinous constituent which attaches the sand to the casting. The prior art discloses many such reagents including sulfuric acid, nitric acid and hydrofluoric acid. In addition, Moir, in United States Patent 2,502,337, discloses the use of fluoboric acid or a mixture of fluoboric and hydrofluoric acid as a means of removing mold sands from metal castings. I have found a chemical reagent which is not only more effective in removing residual sand than the foregoing agents but is in its anhydrous state also less irritating than reagents commonly used for this purpose in its physiological effect on human skin. These beneficial effects are to be obtained by the utilization of a fluophosphoric acid as the effective reagent in solutions employed in the removal of siliceous materials adhering to metal casting which has been formed in a non-permanent sand type mold. The effectiveness of the method employed in this invention is illustrated in the following table in which the effect of various mineral acids on silica sand is summarized in tabular form.

*The solubilizing effect of mineral acids upon silica sand*

| Acid | Weight percent acid | Mols of HF/liter of solution | Reaction time, min. | Reaction temp., °F. | Weight percent of sand removed |
|---|---|---|---|---|---|
| HF | 10.0 | 5.2 | 120 | 80 | 2.51 |
| HF | 20.0 | 10.7 | 120 | 80 | 7.8 |
| HF | 30.0 | 16.5 | 120 | 80 | 16.9 |
| HF | 40.0 | 22.6 | 120 | 80 | 26.5 |
| HF | 48.0 | 27.6 | 120 | 80 | 36.3 |
| Mono FP | 33.6 | 4.2 | 120 | 80 | 2.6 |
| Mono FP | 50.1 | 6.9 | 120 | 80 | 7.4 |
| Mono FP | 66.8 | 10.2 | 120 | 80 | 5.9 |
| Mono FP | 100.0 | 18.0 | 120 | 80 | 0.3 |
| Di FP | 25.2 | 5.8 | 120 | 80 | 5.4 |
| Di FP | 43.8 | 11.3 | 120 | 80 | 16.9 |
| Di FP | 49.1 | 13.1 | 120 | 80 | 20.5 |
| Di FP | 56.2 | 15.5 | 120 | 80 | 18.2 |
| Di FP | 66.9 | 19.3 | 120 | 80 | 12.9 |
| Di FP | 100.0 | 31.0 | 120 | 80 | 0.9 |
| Di FP | 50.0 | 13.4 | 10 | 158 | 10.7 |
| Mixture, 1 part Mono FP to 2 parts Di FP acid | 25.3 | 5.8 | 120 | 80 | 2.8 |
| | 50.0 | 11.5 | 120 | 80 | 16.2 |
| | 76.0 | 20.3 | 120 | 80 | 5.0 |
| Hexa FP | 50.0 | 26.9 | 120 | 80 | 22.5 |
| 67% $H_2SO_4$, 33% HF | | | 120 | 80 | 1.5 |

The procedure followed in educing these results comprised the exposition of weighed samples of silica sand to the separate action of the above enumerated aqueous acidic solution in an acid resistant container. This container was rotated about its longitudinal axis in a constant temperature bath in such a manner that the maximum amount of surface of the sand was made available to the aqueous acid reactant. After a given period of time the sand was water-washed and the amount of sand remaining was determined. The foregoing results obtained through such testing plus the added physiological advantage of the anhydrous fluophosphoric acid indicate the advantages to be obtained by utilizing the chemical reagents of this invention for the removal of residual sand from metal castings. The foregoing fluophosphoric acids, which are presently available in commercial quantities, with which this invention is concerned, are exemplified by monofluophosphoric acid which consists essentially of $H_2PO_3F$, with varying amounts of $HPO_2F_2$ and $H_3PO_4$ as impurities, above entitled as "mono FP acid," difluophosphoric acid consisting essentially of $HPO_2F_2$ identified above as "di FP acid" and hexafluophosphoric acid. This latter acid which is designated in the foregoing table as "hexa FP acid" consists of major proportions of $HPF_6$ and minor amounts of hydrofluoric, monofluophosphoric, difluophosphoric and phosphoric acids as impurities of the commercially available hexafluophosphoric acid. It will be noted that these acids, while in general are effective for the dissolution of silica sand it is preferable, however, to use aqueous solutions containing difluophosphoric acid as the effective component of the treating solution because of the optimum results that are to be obtained through the use of this compound. Mixtures of these acids are also considered within the scope of this invention.

While all concentrations of the acids of this invention are effective for the purpose described it is to be pointed out that a critical effect is to be obtained by employing aqueous solutions of fluophosphoric acids containing about 50% by weight of the said acid.

It is also considered to be within the purview of this invention to employ inhibitors whereby the corrosion of metallic castings subjected to the above described method of chemical cleaning is ameliorated. Suitable corrosion inhibitors such as the acids, anhydrides or salts of trivalent or pentavalent arsenic, particularly arsenous trioxide, may be added to the treating solution to effect this result. Other acid corrosion inhibitors well known in the prior art are also applicable.

The application of this invention is not to be limited to the chemical cleaning of ferrous castings but it is intended that the cleaning solution of this invention be employed in the removal of sand from non-ferrous castings such as aluminum, copper, magnesium, nickel, and their alloys by the use of proper corrosion inhibitors.

I claim:

1. In the chemical cleaning method for removing adhering siliceous particles from metal castings formed in a siliceous refractory non-permanent type mold wherein said casting is immersed in a liquid bath comprising a strongly acidic solution to effect the removal of the said siliceous particles adhering to the said metal casting, and thereafter removed from said acid bath and washed with a neutralizing solution, the improvement comprising immersing said casting in an aqueous solution of a fluophosphoric acid as said step of immersion in acidic solution.

2. A method in accordance with claim 1 in which the fluophosphoric acid is monofluophosphoric acid.

3. A method in accordance with claim 1 in which the fluophosphoric acid is difluophosphoric acid.

4. A method in accordance with claim 1 in which the fluophosphoric acid is hexafluophosphoric acid.

5. A method of cleaning coherent sand particles from metallic castings comprising immersing said casting in a liquid bath of a fluophosphoric acid, said bath containing an inhibitor in an amount sufficient to effectively decrease the corrosion rate of said fluophosphoric acid upon said metal casting, said inhibitor being selected from the group consisting of the acid, anhydride, and salts of trivalent and pentavalent arsenic.

6. A chemical cleaning procedure for eliminating residual sand granules adhering to a metallic casting formed in a sand mold comprising contacting said casting with an acidified aqueous solution containing substantially 50% by weight of a fluophosphoric acid for a time sufficient to separate the said particles, said solution containing an inhibitor in an amount sufficient to suppress the corrosive action of the acidified solution upon the said metal casting, said inhibitor being selected from the group consisting of the acid, anhydride, and salts of trivalent and pentavalent arsenic.

7. A method in accordance with claim 6 in which the fluophosphoric acid is monofluophosphoric acid.

8. A method in accordance with claim 6 in which the fluophosphoric acid is difluophosphoric acid.

9. A method in accordance with claim 6 in which the fluophosphoric acid is hexafluophosphoric acid.

10. A method of cleaning coherent sand particles from metallic castings comprising immersing said casting in a liquid bath of a fluophosphoric acid, said bath containing arsenous trioxide in an amount sufficient to effectively decrease the corrosion rate of said fluophosphoric acid upon said metal casting.

11. A method of cleaning coherent siliceous material from a metal casting which comprises contacting said siliceous material with an aqueous solution of a fluophosphoric acid containing an inhibitor in an amount sufficient to effectively decrease the corrosion rate of said fluophosphoric acid upon said metal casting, said inhibitor being selected from the group consisting of the acid, anhydride, and salts of trivalent and pentavalent arsenic.

WILLIAM A. MARSHALL.

References Cited in the file of this patent
UNITED STATES PATENTS

| Number | Name | Date |
|---|---|---|
| 2,408,784 | Lange II | Oct. 8, 1946 |
| 2,481,807 | Anderson | Sept. 13, 1949 |
| 2,554,358 | Burke | May 22, 1951 |